(12) United States Patent
Lee et al.

(10) Patent No.: US 6,259,823 B1
(45) Date of Patent: Jul. 10, 2001

(54) SIGNAL ADAPTIVE FILTERING METHOD AND SIGNAL ADAPTIVE FILTER FOR REDUCING BLOCKING EFFECT AND RINGING NOISE

(75) Inventors: Yung-lyul Lee; Hyun-wook Park, both of Seoul (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 0 days.

(21) Appl. No.: 08/956,036

(22) Filed: Oct. 22, 1997

(30) Foreign Application Priority Data

Feb. 15, 1997 (KR) ................................. 97-4621

(51) Int. Cl.[7] ........................................... H04N 5/21
(52) U.S. Cl. ............................... 382/268; 382/199
(58) Field of Search ............................ 382/268, 199, 382/266–267, 269, 260–261

(56) References Cited

U.S. PATENT DOCUMENTS

| | | | |
|---|---|---|---|
| 4,847,682 | * | 7/1989 | Tsinberg et al. ................. 358/31 |
| 5,148,809 | * | 9/1992 | Biegeleisen-Knight et al. ...... 128/660.07 |
| 5,363,210 | * | 11/1994 | Sasaki et al. ................. 358/448 |
| 5,430,497 | * | 7/1995 | Strolle et al. ................. 348/607 |
| 5,818,964 | * | 10/1998 | Itoh ............................. 382/205 |
| 5,920,356 | * | 7/1999 | Gupta et al. ................. 348/606 |
| 6,185,320 | * | 2/2001 | Bick et al. ................. 382/260 |

FOREIGN PATENT DOCUMENTS 0 817 497 A2   1/1998   (EP) ........................ H04N/7/50

OTHER PUBLICATIONS

ISO/IEC JTC1/SC29/WG11, MPEG96/M1824, Feb. 1997 Coding of Moving Pictures and Associated Audio Information.

\* cited by examiner

Primary Examiner—Thomas D. Lee
Assistant Examiner—Stephen Brinich
(74) Attorney, Agent, or Firm—Sughrue, Mion, Zinn, Macpeak & Seas, PLLC

(57) ABSTRACT

A signal adaptive filtering method is disclosed for reducing a blocking effect and ringing noise of an image data.

A gradient of the image data is calculated for each pixel of the image data. Then, the gradient data of each pixel is compared with a global threshold value ($T_g$) which is determined based on a predetermined quantization step size (Q), and global edge map information of the pixel is generated. Meanwhile, the gradient data of each pixel is compared with a local threshold value ($T_n$) determined for each block having a predetermined size, and local edge map information of the pixel is generated. An OR operation is performed with respect to the global edge map information and the local edge map information to generate binary edge map information. Then, a predetermined sized filter window is applied to determine whether edges are present in the binary edge map information within the filter window. Afterwards, the image data pixel values of the corresponding filter window are filtered, pixel by pixel, by using predetermined first weighted values to generate a first new pixel value if it is determined that edges are not present. The image data pixel values within the corresponding filter window are filtered, pixel by pixel, by using predetermined second weighted values to generate a second new pixel value if it is determined that edges are present within the window. No filtering is performed if the pixel located at the center of the filter window represents an edge.

15 Claims, 3 Drawing Sheets

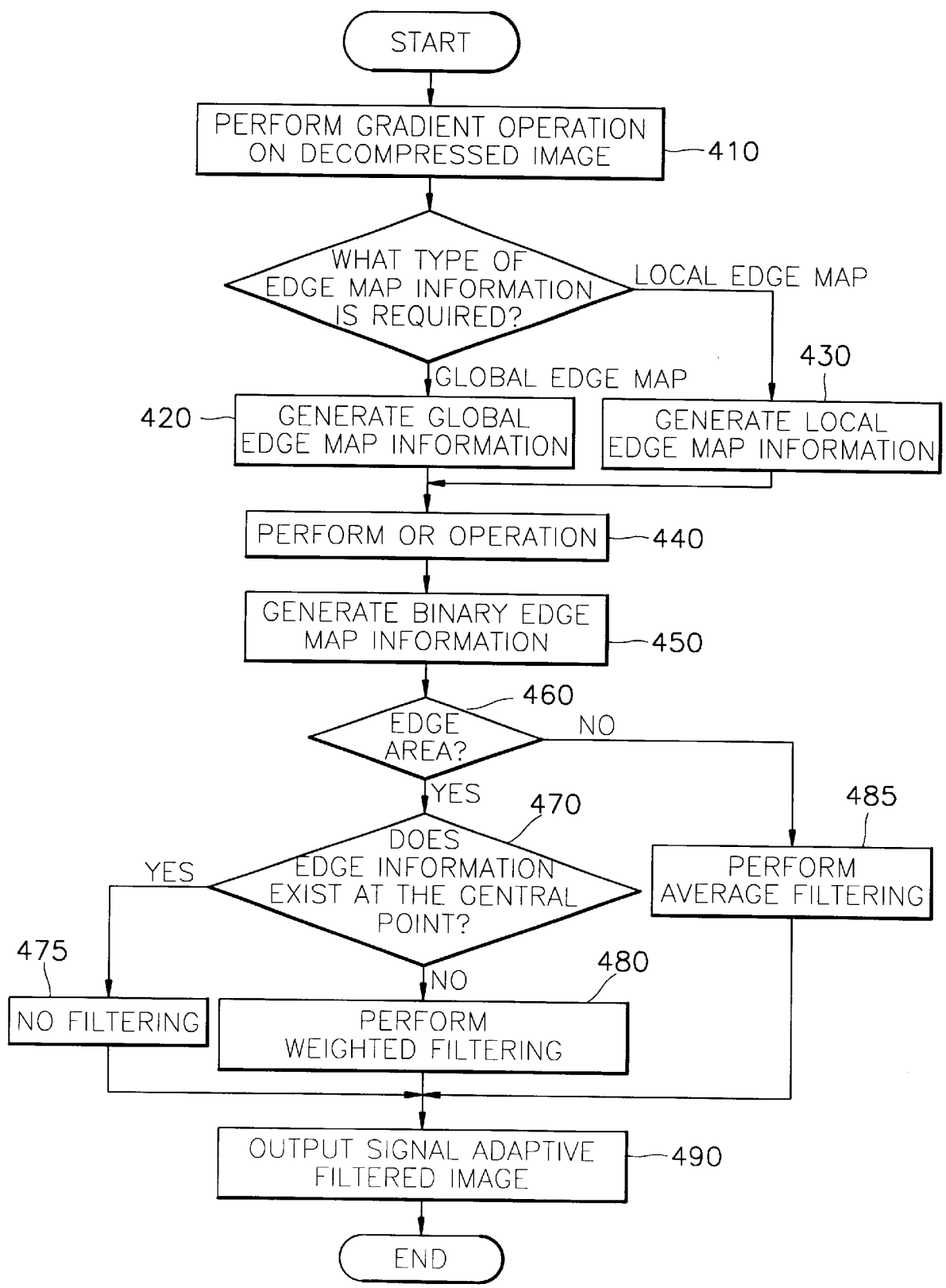

SIGNAL ADAPTIVE FILTERING METHOD AND SIGNAL ADAPTIVE FILTER FOR REDUCING BLOCKING EFFECT AND RINGING NOISE

BACKGROUND OF THE INVENTION

1. Field of the Invention

The present invention relates to data filtering, and more particularly, to a signal adaptive filtering method for reducing a blocking effect and ringing noise, and a signal adaptive filter suitable for the method.

2. Description of the Related Art

Generally, picture encoding standards such as the Motion Picture Expert Groups (MPEG) of the International Organization for Standardization (ISO) and H.263 recommended by the International Telecommunication Union (ITU) adopt block-based motion estimation and discrete cosine transform (DCT) compression of blocks. When an image is highly compressed the block-based coding may cause a blocking effect and ringing noise, as is well known. A typical blocking effect is grid noise in a homogeneous area in which adjacent pixels have relatively similar pixel values. Another blocking effect is staircase noise which has the shape of a staircase and is generated along an edge of the image. Also, the ringing noise is due to the typical Gibb's phenomenon which results from truncation of a DCT coefficient during quantization when the image is highly compressed.

In the case of grid noise, traces caused by the process being performed on each block can be seen at the boundary between blocks when the compressed data is restored to be displayed on a screen. Accordingly, a border between blocks can be noticed by a user. In the case of staircase noise, an edge of the image is shaped like a staircase, so that a jagged edge of the image can be noticed by a user. The ringing noise causes a problem in that an object in the image is displayed as multiple overlapping objects.

SUMMARY OF THE INVENTION

To solve the problems above, an object of the present invention is to provide a signal adaptive filtering method for reducing the blocking effect and ringing noise in a high compression encoding system, and to provide a signal adaptive filter for implementing that method.

In a signal adaptive filtering method according to the present invention, a gradient of the image data is calculated for each pixel of the image data. Then, the gradient data of each pixel is compared with a global threshold value ($T_g$) which is determined based on a predetermined quantization step (Q), and a global edge map information of the pixel is generated. Meanwhile, the gradient data of each pixel is compared with a local threshold value ($T_n$) which is determined for each block having a predetermined size, and a local edge map information of the pixel is generated. An OR operation is performed with respect to the global edge map information and the local edge map information to generate binary edge map information. Then, a filter window of a predetermined size is applied to determine whether edges are present in the filter window based on the binary edge map information within the filter window. Afterwards, the pixel values of the corresponding filter window are filtered pixel by pixel by using predetermined first weighted values to generate a new pixel value if it is determined that edges are not present. Also, the pixel values of the corresponding filter window are filtered pixel by pixel by using predetermined second weighted values to generate a new pixel value if it is determined that edges are present. However, the filtering is not performed if the pixel located at the center of the filter window represents an edge.

Preferably, the global threshold value (Tg) is determined by:

$$T_g = \begin{cases} 4Q + 60, & 6 \leq Q \leq 18 \\ 84, & Q \leq 5 \\ 132, & Q \geq 19 \end{cases}$$

where Q is the quantization step of a quantizer.

Meanwhile, a signal adaptive filter of the present invention comprises an image storing unit for temporarily storing decompressed image data; a gradient operation unit for receiving the image data from the image storing unit in units of blocks having a predetermined size and calculating a gradient of the image data in the horizontal and vertical directions by using gradient operators to find edge pixels; a global edge map generator for comparing the gradient data of each pixel output by the gradient operation unit with a global threshold value ($T_g$) determined based on a quantization step (Q) to generate binary global edge map information; a local edge map generator for comparing pixel by pixel the gradient data output from the gradient operation unit with a local threshold value which is individually determined for each predetermined size block, to generate binary local edge map information; an OR-gate for OR-operating, pixel by pixel, the global edge map information from the global edge map generator and the local edge map information from the local edge map generator to generate binary edge map information; a filter selector for storing the binary edge map information output by the OR-gate and classifying the input image data into an edge area including information of at least one edge and a homogeneous area having no edge information, according to the binary edge map information; an average filter for performing an average filtering on a central pixel within a filtering window of a filtering area when the filtering area is classified as a homogeneous area by the filter selector, to generate a new pixel value; and a weighted filter for performing a weighted filtering on the central pixel within a filtering window of a filtering area when the filtering area is classified as an edge area by the filter selector, to generate a new pixel value.

BRIEF DESCRIPTION OF THE DRAWINGS

The above objects and advantages of the present invention will become more apparent by describing in detail a preferred embodiment thereof with reference to the attached drawings in which:

FIG. 4 is a flowchart illustrating a signal adaptive filtering method according to the present invention.

DETAILED DESCRIPTION OF THE INVENTION

A preferred embodiment of a signal adaptive filtering method and system according to the present invention is described below in detail with reference to the accompanying drawings.

Figure 1:
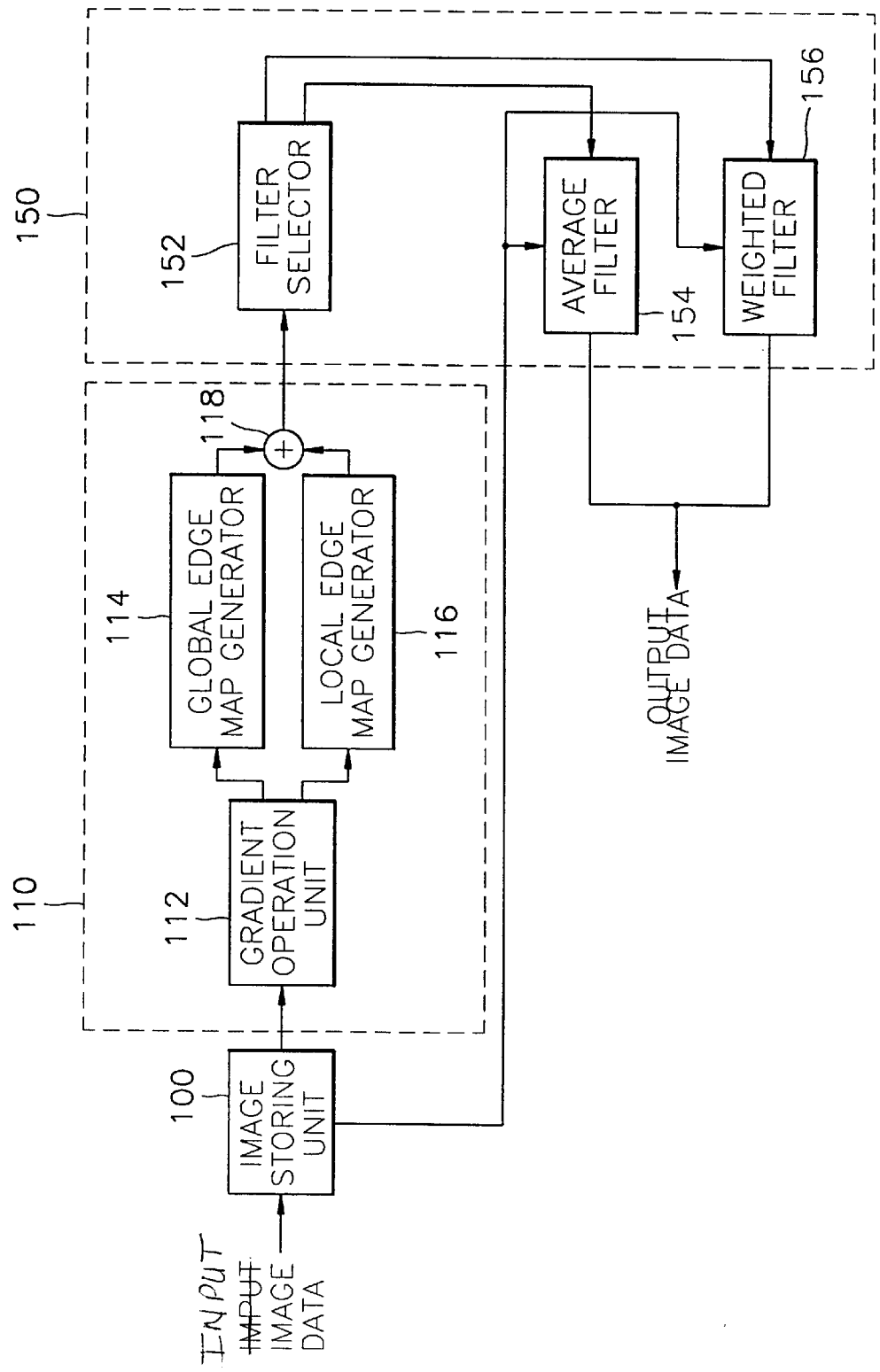
FIG. 1 is a block diagram of a preferred embodiment of a signal adaptive filter according to the present invention.

In FIG. 1, a signal adaptive filter includes an image storing unit 100, a binary edge map information generator 110 and a filtering unit 150. FIG. 4 is a flowchart illustrating a signal adaptive filtering method of the present invention.

The image storing unit 100 temporarily stores image data which passed through an inverse discrete cosine transform (inverse-DCT) and decompression unit, and includes blocking effect and ringing noise.

The binary edge map information generator 110 generates binary edge information including a global edge and a local edge from the decompressed image stored in the image storing unit 100. The binary edge map information generator 110 includes a gradient operation unit 112, a global edge map generator 114 and a local edge map generator 116.

The filtering unit 150 includes an average filter 154 and a weighted filter 156, and a filter selector 152. The filtering unit 150 selects the average filter 154 or the weight filter 156 based on the generated binary edge map information, and filters the decompressed image data by using the selected filter to decrease grid noise and staircase noise.

The gradient operation unit 112 calculates a gradient for each pixel of the image data supplied from the image storing unit 100, by use of a gradient operator in order to find edge pixels (step 410). Preferably, the gradient operator includes a vertical sobel gradient operator ($\nabla_v$) and a horizontal sobel gradient operator ($\nabla_h$). The gradient data produced by the gradient operation unit 112 corresponds to a frame of input image data. Each frame of gradient data is subdivided into blocks of size $M_1 \times M_2$ pixels, where $M_1$ and $M_2$ are integer numbers of pixels. The gradient data is provided to the global edge map generator 114 and the local edge map generator 116.

The global edge map generator 114 receives the gradient data from the gradient operation unit 112 to generate global edge map information for each frame of image data (step 420). The global edge map information, edge(i,j) for the pixel located at position i and j in the image data, is obtained by calculating an absolute gradient sum for each pixel of a frame of input image data and then comparing the absolute gradient sum with a global threshold value $T_g$, as described in the following equation (1).

$$edge(i, j) = 1, \text{ if } |\nabla_h(i, j)| + |\nabla_v(i, j)| \geq T_g \quad (1)$$
$$0, \text{ if } |\nabla_h(i, j)| + |\nabla_v(i, j)| < T_g$$

Here, the global threshold value $T_g$ is determined according to a quantization step Q of a quantizer. In the case where each pixel may have one of 256 gray levels, the global threshold value $T_g$ is determined according to the following equation (2).

$$T_g = \begin{cases} 4Q + 60, & 6 \leq Q \leq 18 \\ 84, & Q \leq 5 \\ 132, & Q \geq 19. \end{cases} \quad (2)$$

Here, the value of quantization step Q is determined according to the bandwidth of a channel supplying the image data. That is, if the bandwidth is large, the Q value is set to be a small value because there is more data to be transmitted.

Thus, the global edge map generator 114 determines the global edge map information edge(i,j) of the pixel to be "1" if the absolute gradient sum calculated for that pixel is greater than or equal to the global threshold value $T_g$. On the contrary, the global edge map generator 114 determines the global edge map information edge(i,j) of the pixel to be "0" if the absolute gradient sum calculated for that pixel is less than the global threshold value $T_g$. The global edge map information is obtained according to the process discussed above for each frame, and is provided to an OR-gate 118.

The local edge map generator 116 receives the gradient data output by the gradient operation unit 112 to generate a local edge map. That is, the local edge map generator 116 calculates a local threshold value with respect to each $M_1 \times M_2$ block of the gradient data and generates the local edge map information with respect to all the pixels within the corresponding block by use of the calculated local threshold value (step 430). According to the MPEG standard, a block-based signal process such as DCT and quantization is basically performed on 8×8 blocks, wherein each block includes 8×8 pixels. Thus, in the present embodiment, the local edge map generator 116 receives the gradient data values in units of a macroblock 16×16 pixels in size. That is, each macroblock includes 16×16 pixels. The local edge map generator 116 generates the local edge map information in 8×8 block units. However, it is noted that the present invention is not limited to operating on macroblock and block sizes discussed in the above embodiment, but can also operate on macroblocks and blocks of other sizes.

A local threshold value $T_n$ of the n-th 8×8 gradient data block is calculated according to equation (3) as follows:

$$T_n = \left| 1 - \frac{\sigma_n}{m_n} \right| * T_g \quad (3)$$

where, $$\sigma_n = \sqrt{\frac{1}{N} \sum_{(i,j) \in R_n} \{g(i, j) - m_n\}^2}$$

$$m_n = \frac{1}{N} \sum_{(i,j) \in R_n} g(i, j).$$

Here, g(i,j) represents a gradient image or a gradient data, $R_n$ represents the n-th 8×8 block region, $m_n$ and $\sigma_n$ denote the average and standard deviation, respectively, of the n-th 8×8 block, and $T_g$ denotes a global threshold value.

Thus, $T_n$ is used to generate detailed edge map information, that is, local edge map information which is not classified as global edges by $T_g$. If the n-th 8×8 block is homogeneous, the ratio of $\sigma_n/m_n$ tends to be " ", so that $T_n$ is nearly equal to $T_g$. On the contrary, if the n-th 8×8 block is a part of a complicated image, the ratio of $\sigma_n/m_n$ increases so that $T_n$ becomes less than $T_g$.

The local edge map generator 116 individually compares the local threshold value $T_n$ of the n-th 8×8 block with some of the gradient data of the block. Here, some of the gradient data corresponds to the 6×6 pixel area of an 8×8 size block, excluding the boundary pixels. If the gradient data used for generating the local edge map is defined as discussed above, detailed information in the image is protected from being blurred, and the grid noise is prevented from being detected as an image edge. If the gradient data which is allowed within the n-th 8×8 size block is greater than or equal to the local threshold value $T_n$, the local edge map generator 116 determines the local edge information corresponding to the block to be "1". On the contrary, the local edge map generator 116 determines the local edge value to be "0" if the gradient value is less than $T_n$. The local edge map information obtained as discussed above is provided to the OR-gate 118.

Figure 2:
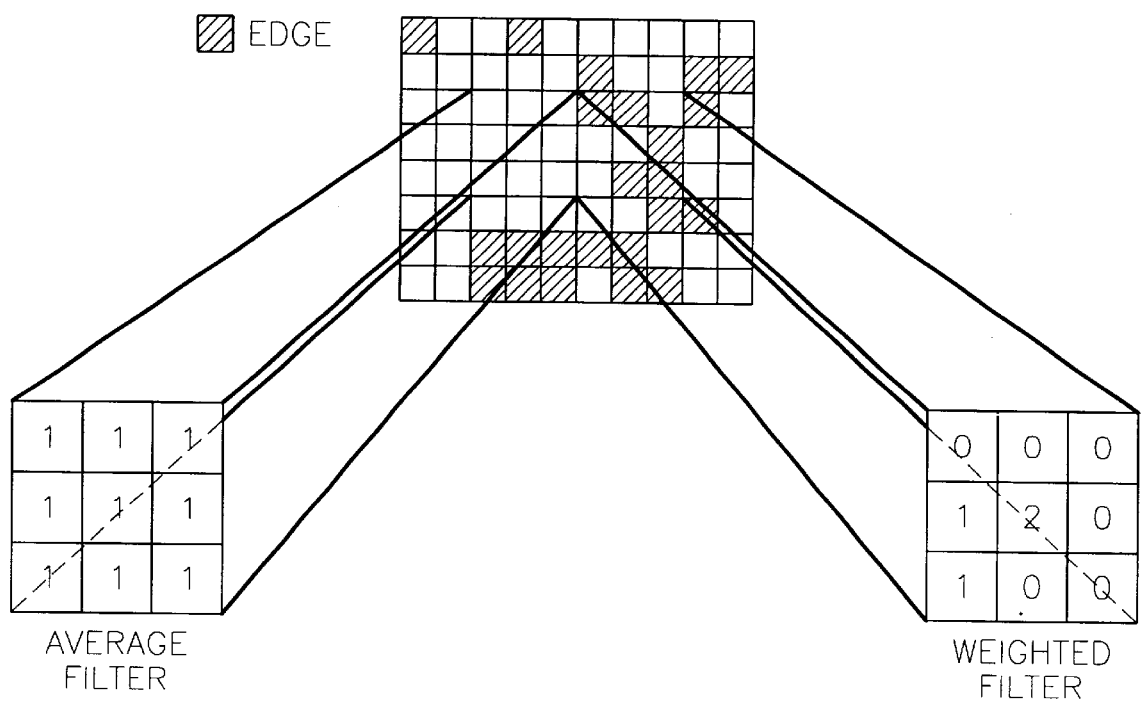
FIG. 2 illustrates a binary edge map generated by a binary edge map information generator and low pass filters used in a signal adaptive filtering unit.

The OR-gate 118 performs an OR operation on the global edge map information generated by the global edge map generator 114 and the local edge map information generated by the local edge map generator 116 (step 440). More specifically, the OR-gate 118 performs the OR operation on the global edge value and the local edge value for each pixel. The OR-gate 118 performs the OR operation with respect to all the global edge values of the global edge map and all the local edge values of the local edge map, to generate binary edge map information (step 450). The OR-gate 118 then outputs the result to a filter selector 152. FIG. 2 shows a binary edge map generated by the binary edge map information generator 110 and low-pass filters used in the filtering unit 150.

The filter selector 152 stores the binary edge map information provided by the OR-gate 118, and classifies the decompressed input image data into edge areas and homogeneous areas according to the binary edge map information output from the binary edge map information generator 110.

The average filter 154 and the weighted filter 156 use a filter window 3×3 pixels in size in the present embodiment. Thus, the filter window used in the filter selector 152 also has a size of 3×3 pixels. The filter selector 152 determines whether a part of the binary edge map in which the filter window is correspondingly located in the image data, belongs to an edge area or a homogeneous area based on the edge information within the filter window (step 460). That is, the filter selector 152 sets an area of the image data to be filtered (filtering area) which is 3×3 pixels in size, for each pixel in the image data, by use of the 3×3 pixel filtering window. Then, it is checked whether any pixel within the filtering area represents edge information. A filtering area having a pixel representing edge information is referred to as an "edge area," and a filtering area without edge information is referred to as a "homogeneous area".

If the filtering area is determined to be an edge area, the filter selector 152 outputs the binary edge map information of the filter window used for the decision, and outputs position data of the central pixel in the filter window to the weighted filter 156 for use in filtering the image data. Also, the filter selector 152 checks whether the central pixel in the filter represents edge information, based on the binary edge map information of the central pixel in the filter window (step 470). If the central pixel represents edge information, the pixel value of the original input image data is used as is without being filtered (step 475). However, if the central pixel does not represent edge information, a weighted filtering is performed for the input image data (step 475). Thus, the pixel value of the central pixel in the filter window is replaced by a new value generated by the weighted filtering.

If the filtering area is determined to be the homogeneous area, the filter selector 152 outputs the position data of the central pixel in the filter window used for the decision, so that the average filter 154 performs an average filtering (step 485) to generate a new value.

Figure 3A:
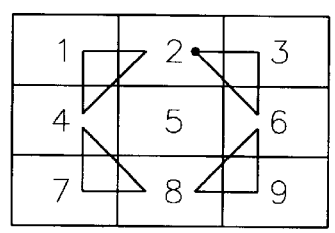
FIG. 3A illustrates a filtering window for a 2-dimensional 3×3 filter.
Figure 3B:
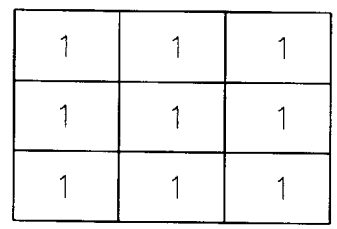
FIGS. 3B and 3C are diagrams showing weights for the 2-dimensional 3×3 filter.
Figure 3C:
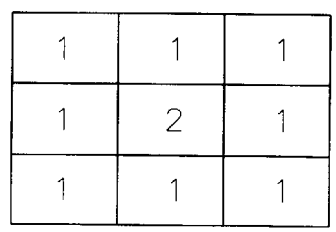

FIGS. 3A, 3B and 3C relate to a two-dimensional 3×3 filter. In detail, FIG. 3A shows a filter window for a 3×3 filter, FIG. 3B shows weights for a 3×3 average filter, and FIG. 3C shows weights for a 3×3 weighted filter, respectively. In the filter window shown in FIG. 3A, the pixel having an index of "5" represents the central pixel in the filter window.

The average filter 154 and the weighted filter 156, which are two-dimensional low pass filters, will now be described in detail.

When the position data of the central pixel is input, the average filter 154 reads the pixel values required for calculating the filtered pixel value of the central pixel from the image storing unit 100. Then, the average filter 154 calculates the filtered pixel value by use of the read pixel values and the weights shown in FIG. 3B. The calculated filtered pixel value is used as a new pixel value for the central pixel.

The weighted filter 156 performs the filtering operation on the image data based on the binary edge map information provided from the filter selector 152 and the position data of the central pixel. The operation of the weighted filter 156 will be described through the following example, for a clearer understanding. If the central pixel of index "5" is on an edge, the weighted filter 156 does not perform a filtering operation on the central pixel. If an edge point (or edge points) exists within the 3×3 filter window, but not at the central pixel, the weighted filter 156 performs the filtering operation on the corresponding image data using the weights shown in FIG. 3C. If edge points are located at the points of index 2 and 6 of FIG. 3A, the weights of the edge points and its outer neighboring point, i.e., the point corresponding to index 3, are set to "0". Similarly, If edge points are at the points 6 and 8, 4 and 8, or 2 and 4 of FIG. 3A, the weights of the edge points and the outer neighboring points are set to "0". Afterwards, the image data passed through the signal adaptive filtering process are output by the average filter 154 or the weighted filter 156 (step 490).

From the image data filtered as described above, a macroblock of size 16×16 pixels is composed again. All the macroblocks in a frame are filtered in such a manner. Here, the size of the blocks filtered by the filtering unit 150 is not limited to the above embodiment of the present invention described above.

According to the present invention, the blocking effect and ringing noise are removed from a block-based processed image. Thus, the peak-to-peak signal-to-noise ratio (PSNR) and the quality of the decompressed image are enhanced.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A signal adaptive filtering method for reducing a blocking effect and ringing noise in image data, the image data including a plurality of pixels divided into predetermined sized blocks, the method comprising:

(a) calculating a gradient of the image data at each pixel of the image data;

(b) comparing the gradient of each pixel with a global threshold value ($T_g$) determined based on a predetermined quantization step (Q) to generate global edge map information for the pixel;

(c) comparing the gradient of each pixel with a local threshold value ($T_n$) determined for each block to generate local edge map information for the pixel;

(d) performing an OR operation on the global edge map information generated in (b) and the local edge map information generated in (c), to generate binary edge map information;

(e) applying a filter window of a predetermined size to determine whether edges are present in the image data within the filter window based on the binary edge map information;

(f) filtering the image data within the filter window, pixel by pixel, by using predetermined first weighted values to generate a first new pixel value if it is determined in (e) that edges are not present; and (g) filtering the pixel values of the corresponding filter window, pixel by pixel, by using predetermined second weighted values to generate a second new pixel value if it is determined in (e) that edges are present, wherein the filtering in (f) and (g) are not performed if the pixel located at the center of the filter window represents an edge.

2. A signal adaptive filtering method as claimed in claim 1, wherein the global threshold value ($T_g$) in (b) is determined by:

$$T_g = \begin{cases} 4Q+60, & 6 \leq Q \leq 18 \\ 84, & Q \leq 5 \\ 132, & Q \geq 19 \end{cases}$$

where Q is a quantization step of a quantizer.

3. A signal adaptive filtering method as claimed in claim 2, wherein $T_n$ is an n-th local threshold value calculated by:

$$T_n = \left| 1 - \frac{\sigma_n}{m_n} \right| * T_g$$

where, $$\sigma_n = \sqrt{\frac{1}{N} \sum_{(i,j) \in R_n} \{g(i,j) - m_n\}^2}$$

$$m_n = \frac{1}{N} \sum_{(i,j) \in R_n} g(i,j)$$

and g(i,j) represents the calculated gradient for pixel (i,j) of the image data image, $R_n$ represents an n-th 8×8 block, $m_n$ and $\sigma_n$ denote the average and standard deviation, respectively, of the calculated gradient of the pixels of the n-th 8×8 block.

4. A signal adaptive filtering method as claimed in claim 3, wherein in (c), the gradient of each of 6×6 pixels which result from excluding boundary pixels from an 8×8 size block, are compared with the local threshold value to generate the local edge map information.

5. A signal adaptive filtering method as claimed in claim 1, wherein the filter window is 3×3 pixels in size.

6. A signal adaptive filtering method as claimed in claim 2, wherein the filter window is 3×3 pixels in size.

7. A signal adaptive filtering method as claimed in claim 5, wherein in (f) the predetermined first weighted values are equal to 1.

8. A signal adaptive filtering method as claimed in claim 6, wherein in (f) the predetermined first weighted values are equal to 1.

9. A signal adaptive filtering method as claimed in claim 5, wherein in (g) the weighted value applied to the pixel located at the center of the 3×3 filter window is equal to 2.

10. A signal adaptive filter comprising:
   an image storing unit for temporarily storing decompressed image data;
   a gradient operation unit for receiving the image data in block units of a predetermined size from said image storing unit, calculating a gradient of the image data in the horizontal and vertical directions by using gradient operators to find edge pixels, and outputting gradient data;
   a global edge map generator for comparing the gradient data output by said gradient operation unit with a global threshold value ($T_g$) determined based on a quantization step (Q) to generate binary global edge map information;
   a local edge map generator for comparing, pixel by pixel, the gradient data output by said gradient operation unit with a local threshold value which is individually determined for each block to generate binary local edge map information;
   an OR-gate for OR-operating, pixel by pixel, the global edge map information generated by the global edge map generator and the local edge map information generated by the local edge map generator to generate binary edge map information;
   a filter selector for storing the binary edge map information output by said OR-gate and classifying the image data into an edge area including information of at least one edge and a homogeneous area without information of any edges, according to the binary edge map information;
   an average filter for performing an average filtering on a central pixel within a filtering window of a filtering area, when the filtering area is classified by the filter selector as a homogeneous area, to generate a first new pixel value; and
   a weighted filter for performing a weighted filtering on the central pixel within the filtering window of the filtering area, when the filtering area is classified by the filter selector as an edge area, to generate a second new pixel value.

11. A signal adaptive filter as claimed in claim 10, wherein the global threshold value ($T_g$) is determined in said global edge map generator according to:

$$T_g = \begin{cases} 4Q+60, & 6 \leq Q \leq 18 \\ 84, & Q \leq 5 \\ 132, & Q \geq 19 \end{cases}$$

where Q is a quantization step size of a quantizer.

12. A signal adaptive filtering method for reducing a blocking effect and ringing noise in image data, the image data including a plurality of pixels, the method comprising:
   (a) determining a gradient of each of the pixels in the image data;
   (b) detecting an edge in an area of the image data based on the gradient determined in (a); and
   (c) performing only a first type of filtering on pixels within the image data area if an edge is detected in (b) and performing only a second type of filtering on pixels within the image data area if no edge is detected in (b);
   wherein the detecting in (b) is performed by generating global and local edge map information based on the gradients of the pixels, and detecting the edge based on the global and local edge map information.

13. A signal adaptive filtering method as claimed in claim 12, wherein the local edge map information is generated based on gradient data of pixels forming a macroblock.

14. A signal adaptive filtering method as claimed in claim 12, wherein the first type of filtering is an average and the second type of filtering is a weighted filtering.

15. A signal adaptive filtering method for reducing a blocking effect and ringing noise in image data, the image data including a plurality of pixels, the method comprising:
   (a) determining a gradient of the pixels in the image data;
   (b) detecting an edge in an area of the image data based on the gradient determined in (a); and
   (c) performing only a first type of filtering on pixels within the image data area if an edge is detected in (b)

and performing only a second type of filtering on pixels within the image data area if no edge is detected in (b);

wherein the first and second types of filtering are performed on pixels within the image data area corresponding to a filtering window having a predetermined size, and wherein neither the first and second types of filtering is performed if the edge is detected for a pixel located in the center of the filtering window.

* * * * *